Patented Feb. 3, 1953

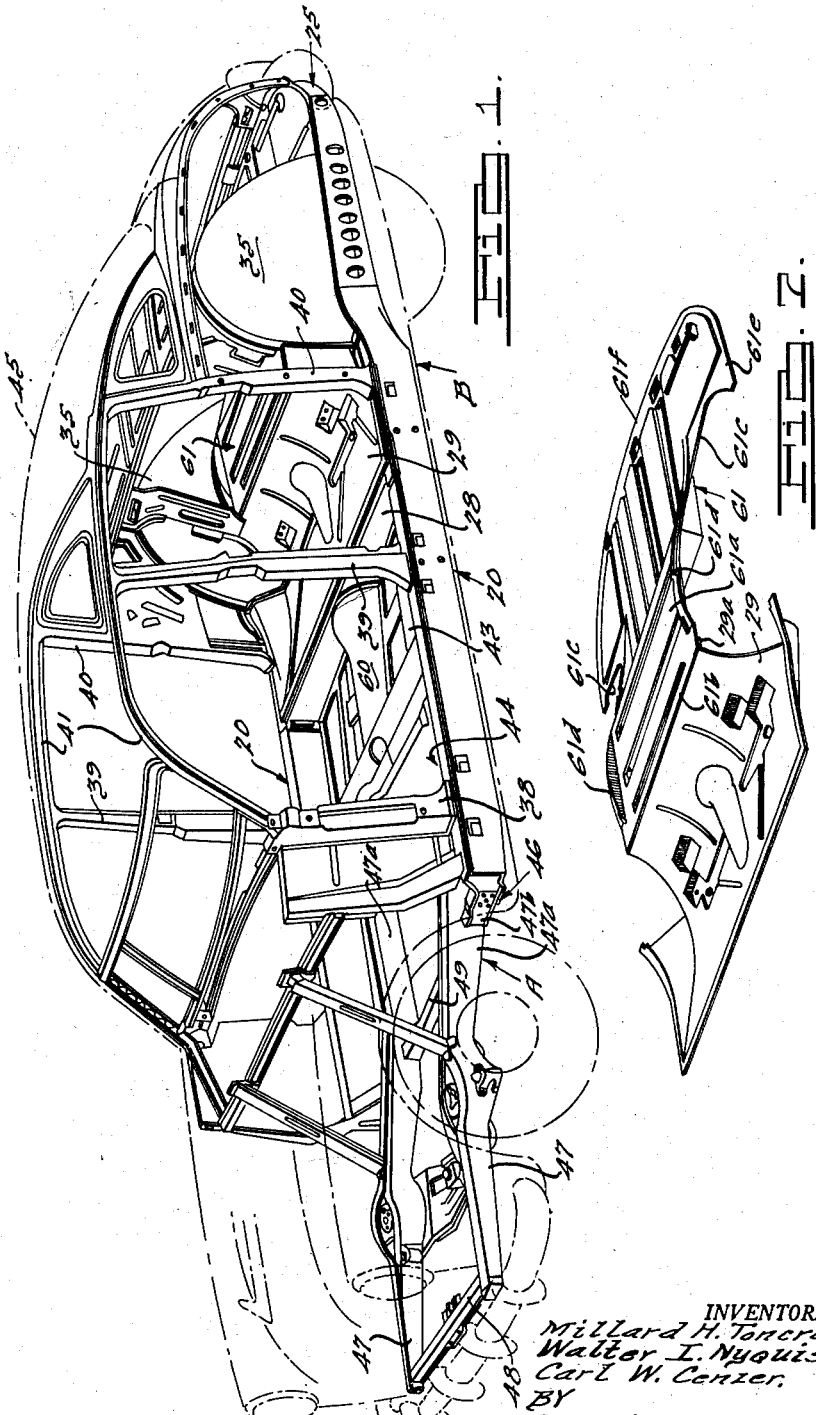

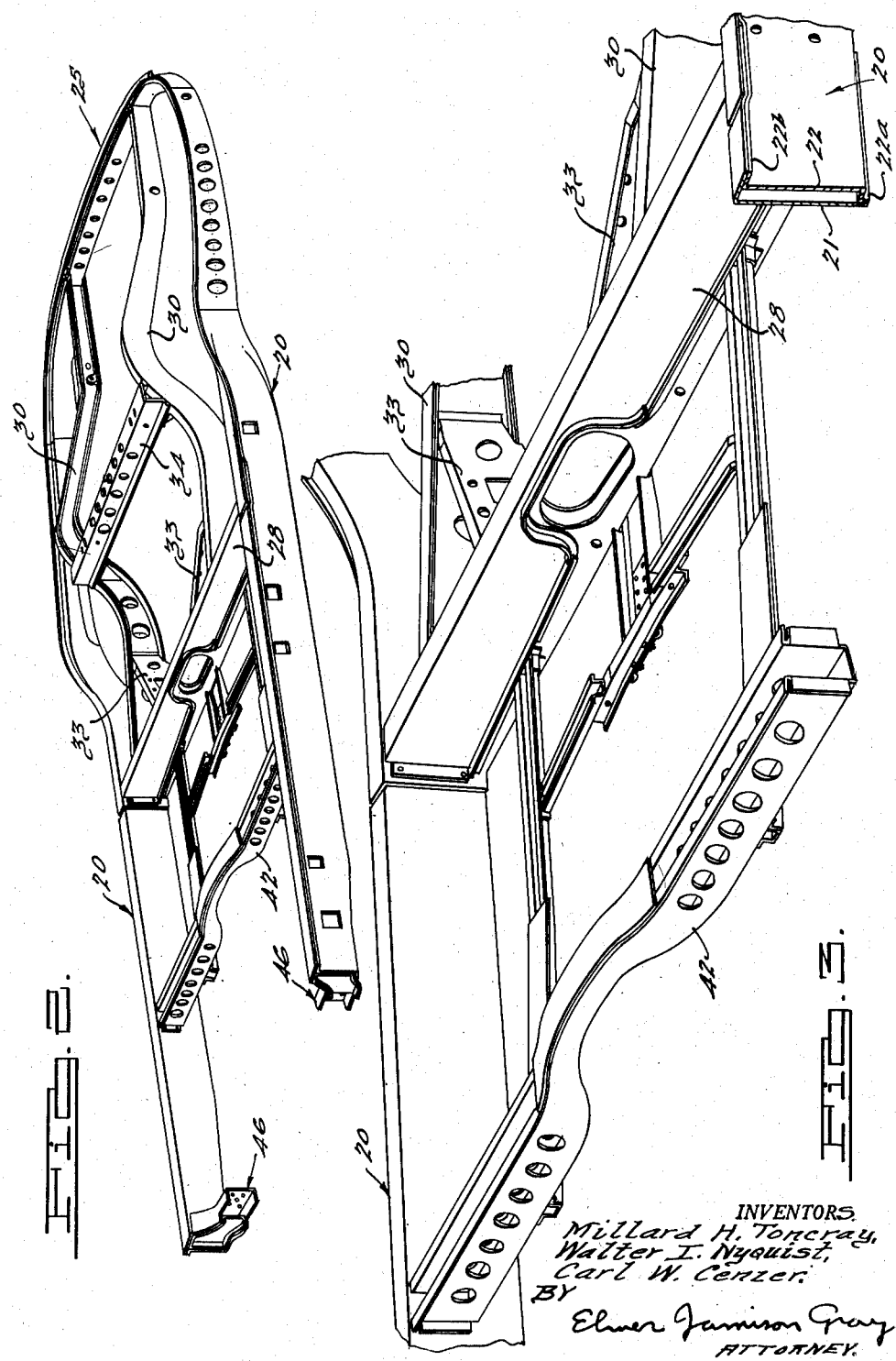

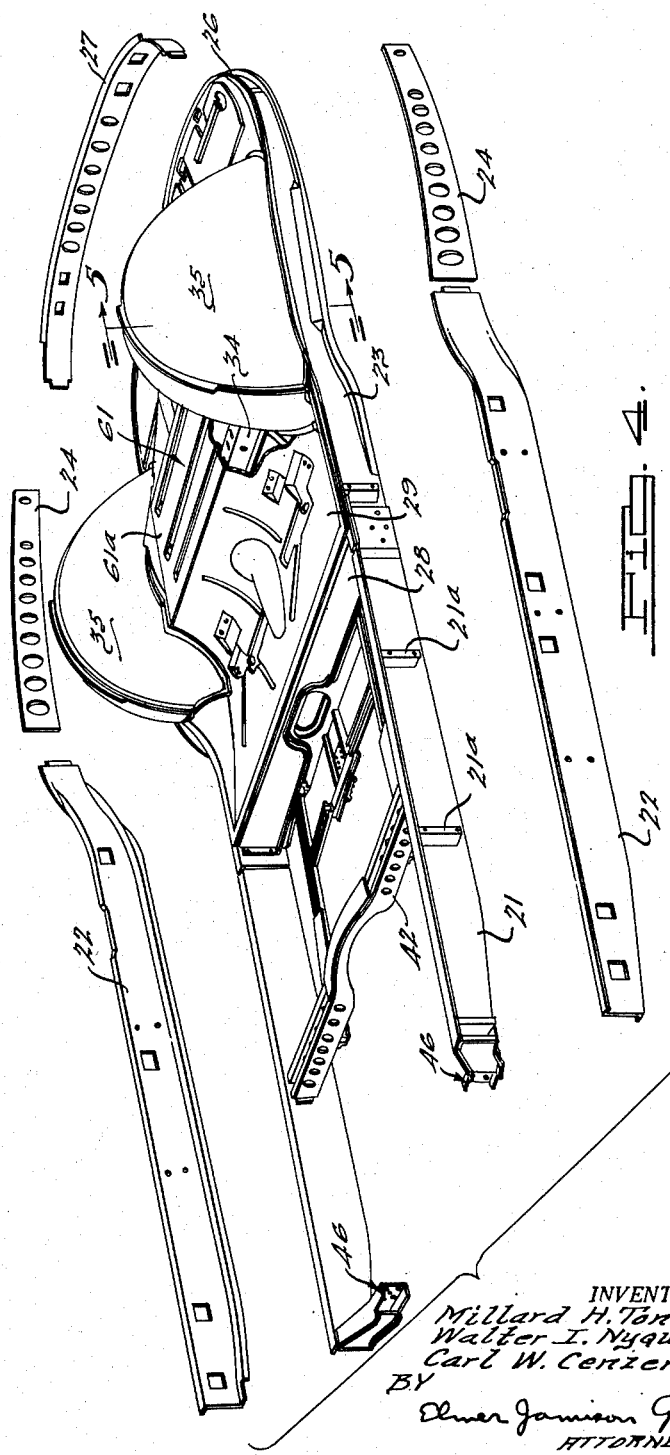

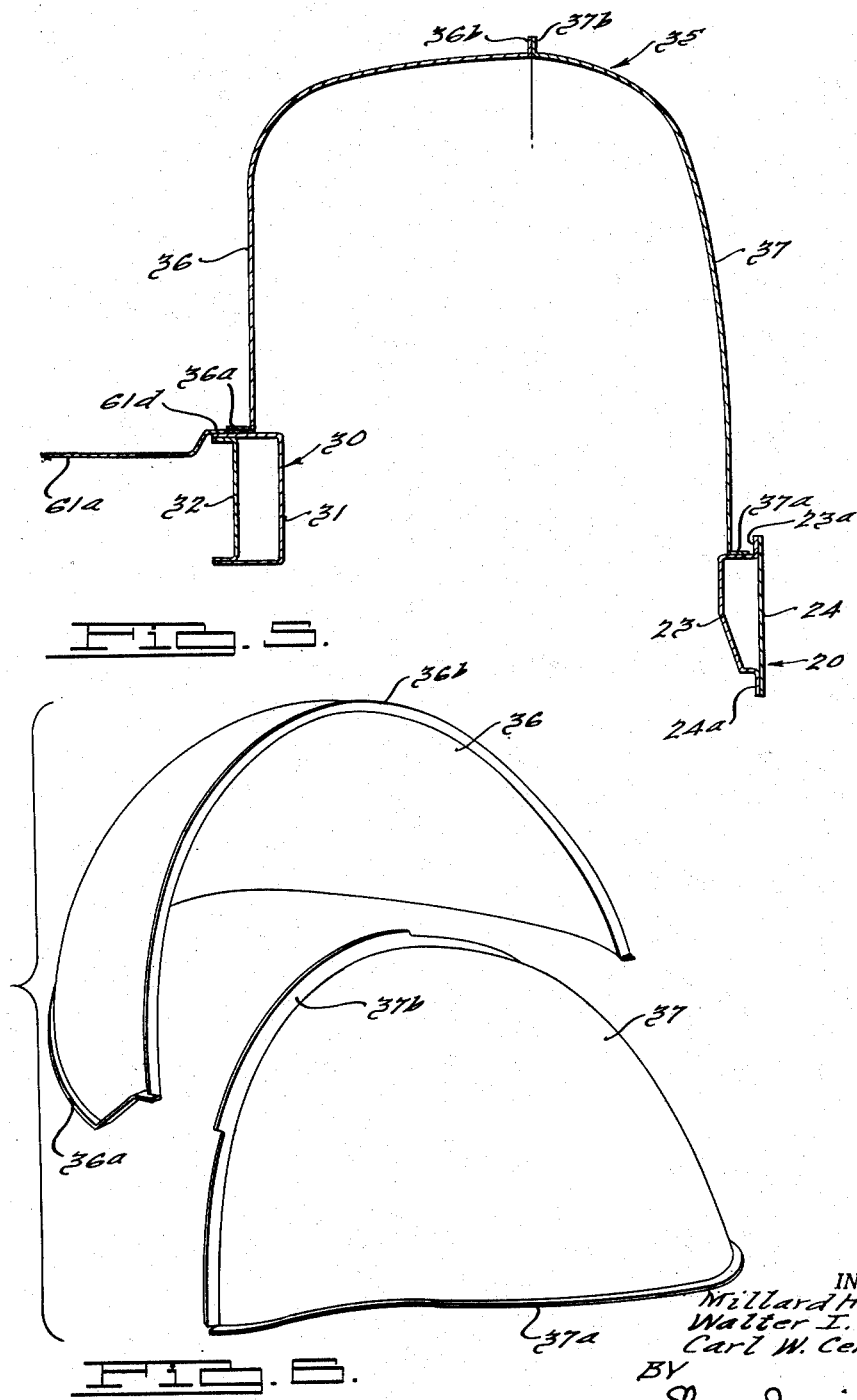

2,627,426

UNITED STATES PATENT OFFICE 2,627,426

MOTOR VEHICLE BODY FRAME

Millard H. Toncray, Grosse Pointe Park, and Walter I. Nyquist and Carl W. Cenzer, Detroit, Mich., assignors to Hudson Motor Car Company, Detroit, Mich., a corporation of Michigan Application June 26, 1948, Serial No. 35,384

3 Claims. (Cl. 280—106)

This invention relates to motor vehicles and more particularly to improvements in the construction of the body and frame of automobiles, the present application being related to application Serial No. 19,616, filed April 7, 1948.

In the foregoing application there is shown and described an improved body and frame structure for an automobile wherein the frame is divided into two front and rear sections with the rear section forming a unitary part of the body, these two frame sections being telescoped and attached together or otherwise united at final assembly in such manner as to produce a composite full length frame possessing all of the requisites of strength and rigidity.

An important object of the present invention is to provide a body frame structure comprising an outer main frame of general U-shape extending completely around the body with the side members thereof spaced substantially the full width of the body to underlie the doors and to extend outside the wheels, said frame structure also comprising inner longitudinal frame members joined to the cross frame members and extending parallel to the outer frame side members substantially the full length of the body. By virtue of the improved frame construction the body is in effect supported by a double longitudinal frame which adds great strength to the car as well as affording the maximum protection in the event of collision.

Another object of the invention is to mount the rear wheels between pairs of longitudinal frame members spanned by wheel housings which completely enclose the upper parts of the rear wheels.

A further object of the invention is to provide a frame structure to support the body of an automobile wherein the rear portion of the frame structure comprises at each side of the vehicle a pair of longitudinal frame members spaced apart to receive a rear wheel, the frame members of each pair being connected together by an upright wheel housing which fully houses the upper part of the wheel. In the preferred embodiment of the invention the wheel housing is fabricated in two sections each secured to one of the frame members and welded together along their abutting edges to form a unitary structure bridging the frame members and tieing the same together. The strength and rigidity of the structure are additionally increased by connecting together the pairs of frame members by transverse frame members at points in front and rear of the wheel housings and also in connecting the inner longitudinal frame members by a transverse frame member at the regions of the wheel housings.

Other objects of this invention will appear in the following description and appended claims, reference being had to the accompanying drawings forming a part of this specification wherein like reference characters designate corresponding parts in the several views.

Fig. 1 is a perspective view illustrating the component assembled frame members of an automobile constructed in accordance with one embodiment of the present invention.

Fig. 2 is a perspective view of that portion of the main frame which supports the body, the latter being removed in this view.

Fig. 3 is an enlarged perspective view, partly in section, of an intermediate portion of the main frame show in Fig. 2.

Fig. 4 is an exploded perspective view of the main frame shown in Fig. 2 and illustrating the wheel housings mounted in place.

Fig. 5 is an enlarged vertical section taken substantially through lines 5—5 of Fig. 4 looking in the direction of the arrows.

Fig. 6 is an exploded perspective view illustrating the two members which form the wheel housings.

Fig. 7 is a perspective view of the rear seat tray and rear compartment floor panel.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the present invention in which the frame structure of the automobile vehicle is divided into two front and rear sections which, as parts of two sub-assemblies, are joined together during the final assembly of the vehicle. The front frame section forming part of the power plant sub-assembly is indicated generally at A, and the rear frame section forming part of the body sub-assembly is indicated generally at B.

The frame section B includes two main longitudinally extending and laterally spaced generally parallel side frame members 20, each being fabricated from a number of parts which are welded together to form unitary frame members which are connected together around the rear of the body to produce a unitary outer frame structure. As illustrated in Figs. 3 and 4, each side frame member comprises inner and outer angle members 21 and 22 which extend to points somewhat in advance of the wheel housing. These angle members are assembled together, as illustrated in Fig. 3, with suitable spacer members 21a interposed therebetween for the purposes of reinforcement. As shown in Fig. 3, the vertical web of the inner angle member 21 overlaps at its lower edge and is welded to a depending flange 22a on angle member 22, and the top flange of angle 21 overlaps an outwardly turned flange 22b of angle 22 and is welded thereto. By virtue of this construction each main side frame member 20 in the length of the angle members 21 and 22 is in the form of a closed box section. The portions of the side frame members 20 formed by the members 21 and 22 are rigidly secured at their rear ends by welding to a pair of inner and outer frame members 23 and 24. The inner frame member 23, as shown in Fig. 5, is channel shaped and formed with upper and lower flanges 23a and 24a to which the outer member 24 is welded, thus providing a box-like section extending substantially to the rear of the body. In the present instance the side frame members 20, fabricated as above described, are attached at their rear ends by welding to a rear transversely extending frame structure 25 which comprises members 26 and 27 assembled and welded together to form a box-like end frame connecting the ends of the box-like frame members 20 and extending around the rear end of the body. From the foregoing it will be seen that the main frame members 20 and 25 produce a generally U-shaped unitary main frame extending continuously around the body along the sides and around the rear end thereof.

The side frame members 20 are connected together by a cross frame member 28 which is box-like in cross-section and is secured at its ends by riveting or welding or both to the members 20. This cross frame member 28 extends substantially along and beneath the front edge of the rear seat which is mounted upon a rear seat tray 29 (Figs. 1 and 7) rigidly secured along its front edge to the top of the frame member 28, as by welding. Mounted inside the main outer frame 20, 25 and spaced inwardly of the sides thereof are a pair of supplemental longitudinal frame members 30 which extend from the cross member 28 to the rear cross frame member 25 and are rigidly secured at their ends to these cross frame members, as by welding. The inner longitudinal frame members 30, as shown in Fig. 5, are box-like in construction and in the present instance each frame member 30 comprises a pair of inwardly opening channel members 31 and 32 which are nested together as shown in Fig. 5 and secured one to the other by welding. The front ends of the frame members 30 are braced to the cross member 28 by means of angularly extending channel shaped braces 33, these braces being rigidly secured to the frame members 30 and the cross member 28 by welding. Rearwardly of the cross member 28 and in the region of the wheel housings the inner longitudinal frame members 30 are rigidly connected together by means of a channel shaped cross frame member 34 which is secured in position by welding.

Since each inner longitudinal frame member 30 lies inwardly of the adjacent outer side frame member 20 there is provided therebetween a space through which one of the rear wheels extends. The spaces between the frame members 20 and 30 occupied by the rear wheels are closed by means of wheel housing units 35 which form complete enclosures for the upper parts of the wheels. As illustrated particularly in Figs. 5 and 6, each wheel housing unit 35 comprises a pair of dished pressed metal sections 36 and 37. Each of these sections is substantially arcuate in shape so as to extend completely around the upper part of the wheel. The inner section 36 also has a depending side wall which extends down to the frame member 30 and terminates in a marginal flange 36a which engages the top of the frame member 30 and is welded thereto. The outer section 37 of the wheel housing unit also has a top generally arcuate portion which extends around the upper part of the wheel. The outer wall of the section 37 extends down to the frame 20 and is formed with an edge flange 37a engaging the top of the frame member 23 and welded thereto. The meeting edges of the wheel housing sections 36 and 37 are formed respectively with flanges 36b and 37b and extend on a curve corresponding generally to the curvature of the wheel. These flanges 36b and 37b, as shown in Fig. 5, are arranged in abutting relation and are welded together.

From the foregoing it will be seen that each of the wheel housings 35 comprises a unitary structure fabricated preferably, although not necessarily, from two sections 36 and 37 which are rigidly welded together and which span the space between adjoining inner and outer longitudinal frame members 20 and 30. Since the lower flanged edges 36a and 37a of each wheel housing are welded to the frame members, the wheel housing forms with these frame members a complete enclosure for the upper part of the rear wheel thereby protecting the same and eliminating the necessity of providing separate fenders which, in accordance with conventional practice, are secured to the body and protrude therefrom. Not only are conventional fenders eliminated by virtue of the present invention but, in addition, the arrangement of the rear wheels between the pairs of longitudinal frame members 20 and 30 provides a very strong and sturdy structure. The improved construction permits the desired side wall contours of the body to be continued harmoniously to the rear of the car without interruptions due to protruding fenders or fender panelling. Furthermore, the arrangement of the frame members 23, 24 outside the rear wheels permits these members to be utilized as reinforcing and stiffening means for the rear quarter panels which extend down opposite the wheels and somewhat outwardly of the wheel house panel 37 and are attached along their lower edges to the frame members 24 which they cover and conceal.

Referring to Figs. 1, 4, 5 and 7, it will be noted that the rear edge of the rear seat tray 29 has a transverse flange 29a overlapping the top of the cross member 34. Rearwardly of this seat tray the underbody of the vehicle is provided with a rear compartment floor panel 61 which has a front horizontal portion 61a extending between the wheel housings 35 and having its front edge 61b overlapping the flange 29a of the rear seat tray and also overlapping the cross frame member 34 to which the flange 29a and edge portion 61b are welded. The rear compartment floor panel is cut away at opposite sides along lines 61c to fit snugly around the wheel housing, the inner side edges 61d of these cut away portions being shaped to rest upon the upper faces of the frame members 30 to which they are welded. The rear side and end edges 61e and 61f of the panel 61 are shaped in accordance with the contour of the rear end of the frame 20, 25 and are welded thereto.

As illustrated in Fig. 1, the super-structure of the body, which is constructed by way of example to provide a four door sedan, comprises front pillars 38, center pillars 39 and rear pillars 40. The side frame members 20 are spaced apart substantially the full width of the body so that the lower ends of the pillars 38, 39 and 40 bear directly upon the frame members 20 and are rigidly secured thereto, as by welding. The upper ends of these pillars are joined together by means of longitudinally extending header members 41. Where the body is designed, as in the present instance, for the purpose of a four door sedan, each front door is installed between the pillars 38 and 39, and each rear door is installed between the pillars 39 and 40, the doors being hinged to certain of these pillars in the usual manner. Thus, it will be seen that by spacing the side frame members 20 substantially the full width of the body so as to directly underlie the lower ends of the pillars, these frame members also will lie directly beneath the lower edges of the door. As a consequence of this construction which gains considerable strength due to the pillars rising directly from the side frame members, it will be apparent that the floor pan or floor lying between the side frame members 20 is not governed as to height by the height of the side frame members.

The main side frame members 20 are joined in advance of the cross frame member 28 by an upwardly opening channel shaped cross member 42 which is upwardly bowed at its center to provide clearance for the propeller shaft tunnel 60. The cross frame member 42 lies between the floors or floor pan portions of the front and rear passenger compartments at substantially the locality of the back of the front seat. The floor pan 43 for the rear passenger compartment, extending between the cross frame members 28 and 42 and at opposite sides of the tunnel 60, is depressed well below the tops of the side frame members 20 as well as the tops of the cross frame member 28. Preferably the floor pan 43 is depressed nearly to the depth of these frame members 20 and 28 as well as the cross frame member 42. In like manner the floor or floor pan 44 for the front passenger compartment in advance of the cross frame member 42 is depressed substantially or nearly to the depth of the frame members 20. The lowering of the floor pans 43 and 44 a distance equal to at least the major depth of the side frame members 20 is rendered possible by spacing these side frame members substantially the full width of the body so that the floor of the body will lie entirely between these side frame members. This permits advantage to be taken of the depth or height of the side frame members in lowering the floor and, as a consequence, lowering the roof panel 45 an equivalent amount and thereby lowering materially the center of gravity of the vehicle.

It will be noted from Fig. 1 that the side frame members 20 terminate a short distance in advance of the front pillars 38. Attached to the front ends of the side frame members 20 are stub frame extensions 46 which extend inwardly preferably at right angles to the frame members 20 and form not only abutments for locating the front frame unit A when assembled with the frame unit B but also connectors therefor. As shown and described more fully in the above mentioned application Serial No. 19,616, the stub frame extensions 46 are in the form of channels opening forwardly and are rigidly attached by welding to the forward terminal ends of the frame members 20.

The front sub-assembly unit A comprises spaced longitudinally extending side frame members 47 which may be box-like in construction generally similar to the side frame members 20. These members 47 are joined together at their front ends by a front cross member 48 which is preferably box-like in cross-section. The frame members 47 of the front sub-assembly unit A provide mountings for the power plant, front wheels, shock absorbers, springs, steering mechanism and associated parts. These members have extensions 47a which extend rearwardly between and are spaced inwardly of the frame members 20, and as disclosed in the above mentioned application the rear ends of these frame extensions 47a are rigidly attached to the cross member 42 when the sub-assemblies A and B are assembled together. The frame extensions 47a are rigidly connected together in line with the stub extensions 46 by means of a cross frame member 49 which is in the form of an inverted U-shaped channel. This channel extends through slots in the frame extensions 47a and is rigidly secured thereto by welding. The cross frame member 49 extends laterally beyond the outer sides of the frame extensions 47a to provide connector extensions 47b.

During the final assembly operation when the frame sections A and B of the front and rear sub-assemblies are assembled together, the front section A is telescoped with the rear section by shifting the frame extensions 47a into position between the side frame members 20 so as to couple the extensions 47b with the connector members 46. When this is accomplished these coupled portions are rigidly welded together. At the same time the rear terminal ends of the frame extensions 47a are positioned beneath the cross frame member 42 and rigidly secured thereto by bolts and welding in the manner more fully shown and described in the above mentioned application.

We claim:

1. In a motor vehicle, a pair of outer longitudinal side frame members, a rear cross frame member joining the rear ends of said side frame members together, a cross frame member located forwardly of said rear cross frame member and extending continuously from one outer side frame member to the other and rigidly joining the same together, a pair of inner longitudinal side frame members lying between and spaced inwardly of said outer side frame members, opposite ends of said inner side frame members being joined to said cross frame members, each adjacent pair of inner and outer side frame members being spaced apart to receive therebetween the upper portion of a rear wheel, a wheel housing spanning and joining each such pair of side frame members, and a third cross frame member joining said inner side frame members at the localities of said wheel housings.

2. In a motor vehicle, a pair of main outer longitudinal side frame members, an intermediate cross frame member and a rear cross frame member extending continuously between and connecting said side frame members together, a pair of inner longitudinal frame members spaced inwardly of said main side frame members to provide therewith spaces through which the rear wheels extend, the forward and rear ends respectively of said inner frame members being joined to said intermediate cross frame member and said rear cross frame member, a wheel housing arched transversely across the space between each pair of adjacent frame members and secured thereto, and a cross frame member joining said inner frame members at the locality of said wheel housings and between said intermediate and rear cross frame members.

3. In a motor vehicle, a main frame structure comprising a pair of generally parallel inner and outer longitudinal frame members at each side of the vehicle, the members of each pair being spaced apart to receive a rear wheel, a rear cross frame member joining the rear ends of said outer frame members, a cross frame member located forwardly of said rear cross frame member and extending continuously from one outer frame member to the other and joining the forward ends of said inner frame members, means reinforcing the frame structure including a wheel housing arched transversely and longitudinally over the pair of longitudinal frame members at each side, the lower lateral edges of each wheel housing being secured to the corresponding pair of longitudinal frame members, and a cross frame member joining together the inner longitudinal frame members at the locality of said wheel housings.

MILLARD H. TONCRAY.
WALTER I. NYQUIST.
CARL W. CENZER.

REFERENCES CITED

The following references are of record in the file of this patent:

UNITED STATES PATENTS

| Number | Name | Date |
|---|---|---|
| 1,475,330 | Wales | Nov. 27, 1923 |
| 1,475,331 | Wales | Nov. 27, 1923 |
| 1,880,844 | Curtiss | Oct. 4, 1932 |
| 2,038,581 | Lent | Apr. 28, 1936 |
| 2,055,594 | Steinecke | Sept. 29, 1936 |
| 2,073,058 | Greene | Mar. 9, 1937 |
| 2,155,147 | Nelson | Apr. 18, 1939 |
| 2,190,227 | Best | Feb. 13, 1940 |
| 2,240,022 | Saives | Apr. 29, 1941 |
| 2,297,198 | Borgward | Sept. 29, 1942 |